(12) United States Patent
Dobler et al.

(10) Patent No.: US 6,923,080 B1
(45) Date of Patent: Aug. 2, 2005

(54) DEVICE AND METHOD FOR MONITORING THE SURROUNDINGS OF AN OBJECT

(75) Inventors: Günter Dobler, Altbach (DE); Holger Enigk, Rangsdorf (DE); Siegfried Rothe, Denkendorf (DE); Roland Stechow, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/333,409

(22) PCT Filed: Jun. 29, 2001

(86) PCT No.: PCT/EP01/07492

§ 371 (c)(1),
(2), (4) Date: Jun. 17, 2003

(87) PCT Pub. No.: WO02/09433

PCT Pub. Date: Jan. 31, 2002

(30) Foreign Application Priority Data

Jul. 20, 2000 (DE) ................. 100 35 223

(51) Int. Cl.⁷ .............................................. G01D 7/02
(52) U.S. Cl. ..................................................... 73/866.1
(58) Field of Search ...................... 73/866.1; 348/135, 348/148; 345/204

(56) References Cited

U.S. PATENT DOCUMENTS

| | | | | |
|---|---|---|---|---|
| 5,130,794 A | * | 7/1992 | Ritchey | 348/39 |
| 5,200,818 A | * | 4/1993 | Neta et al. | 348/39 |
| 5,247,306 A | * | 9/1993 | Hardange et al. | 342/70 |
| 5,670,935 A | * | 9/1997 | Schofield et al. | 340/461 |
| 6,115,651 A | * | 9/2000 | Cruz | 701/1 |
| 6,233,004 B1 | * | 5/2001 | Tanaka et al. | 348/48 |
| 6,373,055 B1 | * | 4/2002 | Kerr | 250/330 |
| 6,476,731 B1 | * | 11/2002 | Miki et al. | 340/937 |
| 6,515,597 B1 | * | 2/2003 | Wada et al. | 340/988 |
| 2002/0039065 A1 | * | 4/2002 | Hsiang | 340/435 |
| 2002/0135573 A1 | * | 9/2002 | Kanamori | 345/204 |
| 2003/0030724 A1 | * | 2/2003 | Okamoto | 348/148 |

FOREIGN PATENT DOCUMENTS

| | | |
|---|---|---|
| DE | 4304005 | 8/1994 |
| DE | 19923964 | 12/1999 |
| EP | 0949818 | 10/1999 |
| GB | 2338363 | 12/1999 |
| JP | 59120877 | 7/1984 |

* cited by examiner

Primary Examiner—Charles Garber
(74) Attorney, Agent, or Firm—Crowell & Moring LLP

(57) ABSTRACT

A monitoring apparatus having an obstacle-detecting system comprises a plurality of detecting devices fastened on the object, an evaluation unit and an optical display device.

For the purpose of displaying the surrounding situation more effectively, the fields of view of two neighbouring detecting devices intersect, the individual images of these detecting devices are combined to form an overall image, and the object can be projected on the display device into the overall image and can be displayed as part of the overall image.

16 Claims, 4 Drawing Sheets

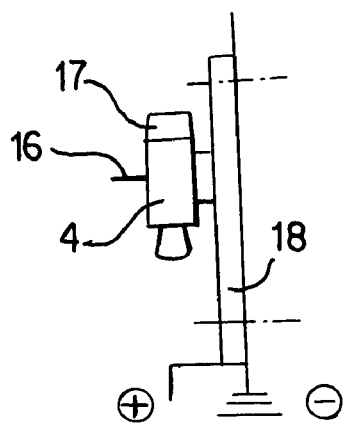
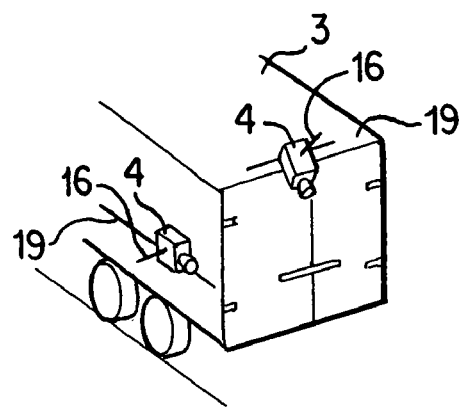
Fig.7a    Fig.7b
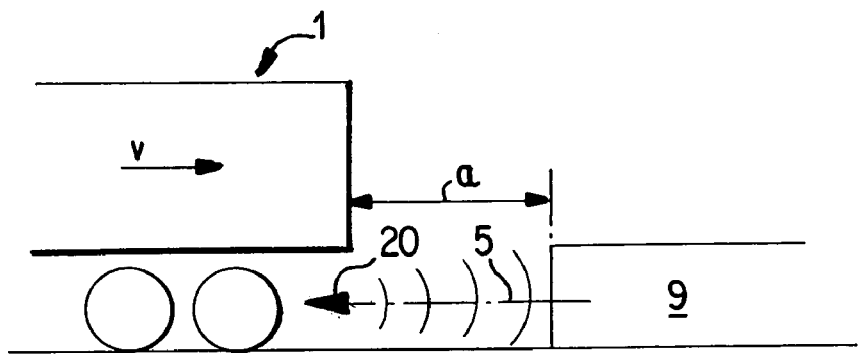
Fig. 8a
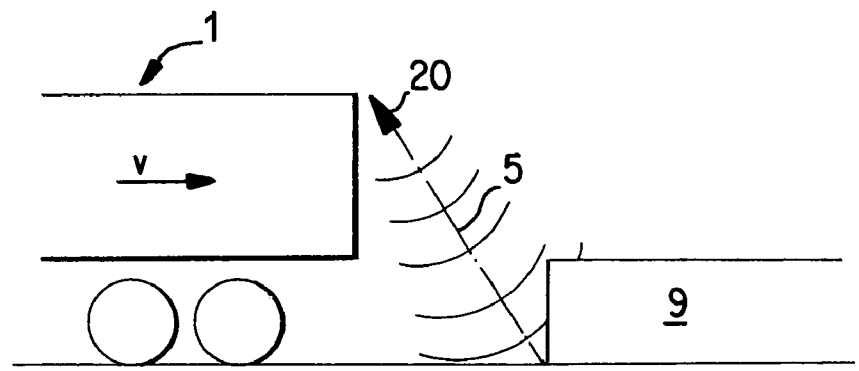
Fig. 8b

DEVICE AND METHOD FOR MONITORING THE SURROUNDINGS OF AN OBJECT

This application claims the priority of PCT International Application No. PCT/EP01/07492, filed Jun. 29, 2001 and German Application No. 100 35 223.5, filed Jul. 20, 2000, the disclosures of which are expressly incorporated by reference herein.

The invention relates to an apparatus and a method for monitoring the surroundings of an object.

It is known from British Patent GB 23 38 363 A to monitor the area behind a motor vehicle with the aid of video cameras fastened on the tail end of the vehicle, and to display the images supplied by the video cameras on a monitor in the driver's cab. In this case, the video cameras are intended to replace the rearview mirror of the vehicle and, in particular, to ensure a complete view rearwards with the exclusion of blind angles. Moreover, the individual images of the video cameras can be combined to form a panoramic image such that a larger overview of the area behind the vehicle can be displayed on only one image.

The monitoring apparatus disclosed in GB 23 38 363 A can be used as a substitute for one or more rearview mirrors, and offers the advantage, that a relatively large area to the rear can be displayed on an overall image and, further the overall image can be displayed on a monitor which is located in the driver's cab in the immediate area of view of the driver so that the driver can keep his head directed straight ahead and still have a view of the area behind.

It is a disadvantage of this arrangement that the individual images recorded by the individual cameras, which are combined to form the overall image in each case have approximately the same direction of view opposite to the forward driving direction of the vehicle, and it is therefore possible only with difficulty to estimate the distance from obstacles approaching the tail end of the vehicle, particularly because of perspective distortions.

The present invention addresses the problem of designing the monitoring of the surroundings of an object as simply as possible. The images supplied by a monitoring apparatus expediently reproduce the actual situation in a fashion which is largely free from distortions and can be detected directly.

The monitoring apparatus of the present invention includes a plurality of obstacle-detecting devices, in particular video cameras, where at least two directly neighbouring detecting devices have intersecting fields of view. The images are combined in an evaluation unit to form an overall image, the overlap area or intersection area being taken into account in the evaluation and being represented as a continuous transition between the individual displays of neighbouring detecting devices. Monitoring without gaps can be done with the aid of intersecting fields of view; blind angles and/or zones which cannot be reached between neighbouring detecting devices can be avoided.

For an optimum display, the object to be monitored is projected into the overall image and displayed on the optical display device as part of the overall image. As a result, the display device displays both the object to be monitored and the surroundings of the object which are to be monitored, and all the surrounding obstacles or foreign objects are put into an optical relationship with the object to be monitored. The monitoring person can immediately identify the relative position of the object to be monitored with reference to a foreign object on the display device. The overall image displayed on the optical display device is in this case expediently a reproduction of the actual situation which is true to scale and/or directionally acurate, and in this case, in particular, the longitudinal axis and the transverse axis of the vehicle displayed match the corresponding axes of the real vehicle.

The monitoring apparatus is expediently of self-adjusting construction, for example, in that identical pixels from the intersection region of neighbouring fields of view are identified.

It is possible to monitor both mobile objects and immobile objects. In the case of mobile objects, consideration is given, in particular, to monitoring vehicles such as passenger cars or lorries. It is possible by interconnecting a plurality of optical obstacle-detecting devices, of which two directly adjacent ones in each case have an intersecting field of view, to create an overall image. By using additional detecting devices, the overall image can be arbitrarily extended so that, if necessary, the entire area around the object—the entire area surrounding the vehicle in the case of vehicles—can be monitored, displayed on only one overall image and put into a relationship with the object to be monitored. Such an overall image represents a panoramic view such that the monitoring person, in particular the driver, can detect the overall external area around the object to be monitored, doing so with one glance.

The viewing axes of the detecting devices are advantageously directed towards the ground, as a result of which an overall image is produced which corresponds to the image from an aerial perspective, with the center of the overall image containing the object to be monitored. Particularly in the case of vehicles, this perspective can be detected quickly and simply by the monitoring person and/or the driver.

Within the overall image, the object to be monitored is expediently an artificially produced equivalent image which is projected into the overall image, for example as a simple graphic representation of the outline of the object. Particularly in the case of vehicles, the detecting devices are positioned in such a way that the lateral edges of the object are also still detected, in order to avoid blind spots and blind angles in the immediate vicinity of the object. The outer radius of the area to be monitored, at the centre of which the object to be monitored is located, is selected to be sufficiently large, particularly in the case of moving objects, in order to give the driver the possibility, at least when driving slowly, of taking evasive action or reacting by braking in the event of suddenly occurring obstacles. The obstacle-detecting devices are expediently mounted moveably on the object to be monitored so that it is possible when driving or else during standstill to pan out with increasing speed automatically or at the request of the monitoring person to a larger monitoring radius, it being possible in this case, if appropriate, to include a blind spot in the immediate near zone in relation to the object to be monitored. When use is made of cameras as detecting devices, a change in the field of view can also be carried out by zooming the camera image. The perspective of one or of a plurality of detecting devices can be set variably, for example via a joystick or similar operating elements.

Both optical systems such as cameras and scanning systems based on infrared, radar or acoustic oscillations as obstacle-detecting devices. The obstacle or the foreign object is scanned by the detecting device or detected optically and converted in the evaluation system into an overall optical image into which an image of the object to be monitored is projected.

The monitoring of the object can also be implemented as a background function by dispensing with a permanent display on the display device and the display only being activated when a triggering condition is fulfilled. For example, the background function can be activated for monitoring the vehicle during parking with the system deciding automatically, by evaluating the signals of the detection devices, whether the vehicle and the surroundings of the vehicle are displayed on the display device and/or a warning signal is to be produced.

Further advantages and expedient designs are to be gathered from the further claims, the description of the figures and the drawings.

BRIEF DESCRIPTION OF THE DRAWING

FIG. 8a shows a representation of the tail-end area of the vehicle in a side view with ultrasonic or infrared sensors, directed into the rear area, with a horizontal viewing axis parallel to the ground, and FIG. 8b shows a representation, corresponding to FIG. 8a, but with ultrasonic or infrared sensors directed obliquely onto the ground.

DETAILED DESCRIPTION OF THE PREFERRED EMBODIMENTS

Identical components are provided in the following figures with identical reference symbols.

Figure 1:
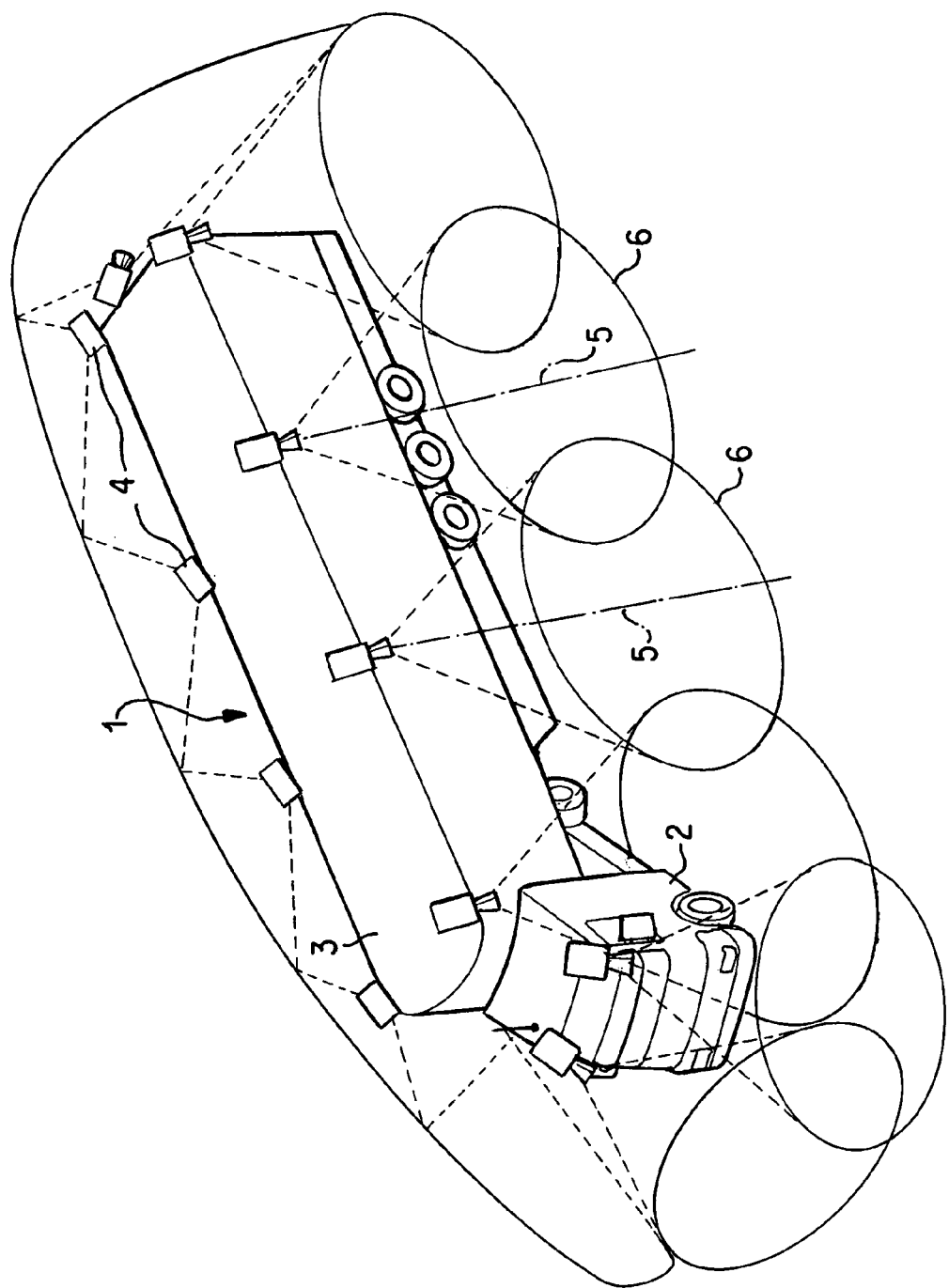
FIG. 1 shows a perspective view of an articulated vehicle with a semitrailer having a plurality of cameras fastened on the top edge of the driver's cab and of the semitrailer.

In the perspective representation according to FIG. 1, a vehicle 1 is shown which is designed in the exemplary embodiment as an articulated structure with a tractor 2 and a semitrailer 3 drawn by the tractor. The vehicle 1 is equipped with a monitoring apparatus for monitoring the surroundings, which includes a plurality of cameras 4 which are fastened on the vehicle 1 and whose individual images are fed for evaluation to an evaluation unit which is carried along in the vehicle 1. The individual images of the cameras 4 are combined in the evaluation unit to form an overall image, and are displayed on a monitor situated in the direct area of view of the driver. The monitoring apparatus renders it possible to identify obstacles which come into the field of view of the camera 4 such that the driver can react to the obstacles in good time and in a suitable way.

The cameras 4 are arranged distributed over the circumference of the vehicle 1 for the purpose of representing a 360° perspective. The cameras are fastened at approximately the same height in the upper area of the vehicle. The viewing axes of the cameras point obliquely downwards onto the ground; owing to the fact that the viewing direction of the cameras is inclined to the ground, an approximately elliptical field of view 6 is produced on the ground for each camera 4. In each case, two neighbouring cameras are aligned with one another in such a way that their fields of view 6 intersect on the ground. This produces a strip-shaped monitoring area surrounding the vehicle 1 without gaps. The intersecting surfaces in the fields of view 6 of neighbouring cameras are taken into account in the evaluation unit in such a way as to produce a sharp overall image advancing continuously from one field of view to the next. It is expedient for the viewing axes of directly neighbouring cameras 4 to lie substantially parallel to one another or to cover only a small angle, in order to ensure that neighbouring fields of view 6 have approximately the same perspective, with the result that no, or only slight, distortions are produced between neighbouring fields of view 6.

Figure 2A:
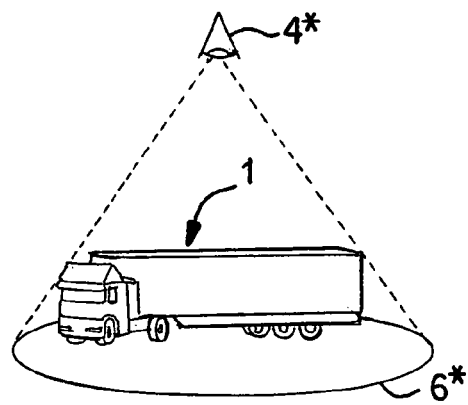
FIG. 2a shows a representation of the monitoring apparatus from an aerial perspective.

The viewing axes 5 have an angle inclined with reference to a perpendicular to the ground. The viewing axes 5 of the cameras 4 intersect at a point or penetrate a comparatively small hypothetical surface which is located over the vehicle 1 and marks an aerial perspective. This aerial perspective is indicated in FIG. 2a symbolically with the aid of a single camera 4* which is located above the vehicle 1 and with the aid of which the vehicle 1 can be recorded with a theoretically possible single field of view 6.

Figure 2B:
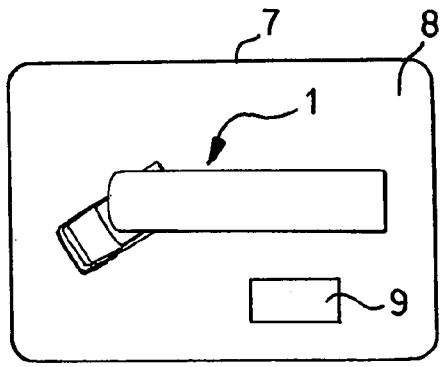
FIG. 2b shows the overall image displayed on an optical display device.

FIG. 2b shows the overall image, to be displayed to the driver on a monitor 7, of the vehicle 1 from the aerial perspective which is combined from the individual images shown in FIG. 1. The vehicle 1 is projected into the overall image 8 and can be displayed as an artificial graphic object. The proportions of the vehicle 1 are expediently inserted into the overall image 8 in a fashion true to scale. Obstacles 9 in the overall image 8 which are detected by the cameras constitute a foreign object which is to be perceived directly by the driver on the monitor 7 and is displayed as a concrete image, and whose relative position and relative angular position in relation to the vehicle 1 can be gathered from the overall image 8.

In the case when, instead of cameras, use is made of alternative detecting devices, for example infrared, radar or acoustic devices with the aid of which the foreign object cannot be represented directly visually, it is possible in the evaluation unit to project into the overall image 8 artificial graphic objects which are intended to represent the foreign object.

It is necessary to determine the articulation angle $\alpha$ between the tractor 2 and semitrailer 3 in order to display as precise as possible a top view of the area surrounding the vehicle. In accordance with a first design, this can be carried out with the aid of an edge traction in which the side edges 10 and 11 of the tractor 2 and the semitrailer 3, respectively, which run onto one another are determined optically, and the angle $\beta$ between the edges 10 and 11, which represents the complementary angle to the articulation angle $\alpha$, is determined in the evaluation unit. The articulation angle $\alpha$ is then calculated as $$\alpha = 180° \beta.$$

Figure 3A:
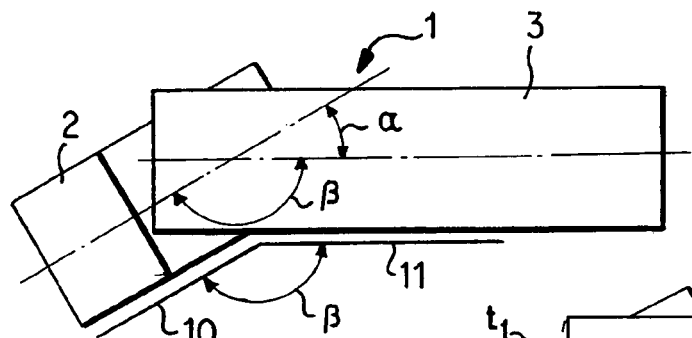
FIG. 3a shows a schematic representation of the vehicle with semitrailer bent away from the vehicle.
Figure 3B:
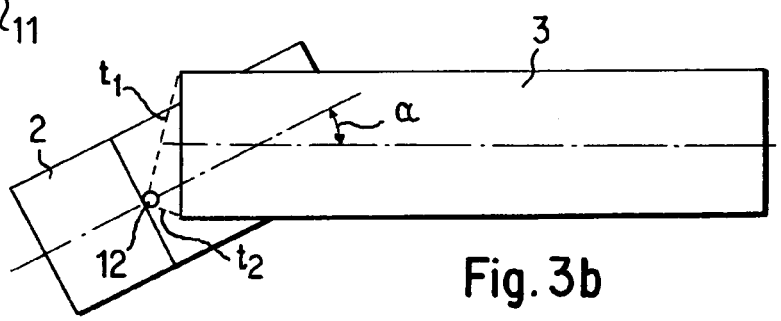
FIG. 3b shows a representation, corresponding to FIG. 3a, with a measuring device on the vehicle for the purpose of measuring the articulation angle of the semitrailer in relation to the tractor.

As represented in FIG. 3b, in a further design the articulation angle $\alpha$ can also be determined with the aid of a triangulation method by using a measuring device 12 arranged, for example, on the tractor 2, to measure the travel time of beams $t_1$ and $t_2$ which are emitted from the measuring device 12 to the front lateral edges of the semitrailer 3. The articulation angle α can then be deduced from the travel time difference for beams $t_1$ and $t_2$.

Figure 3C:
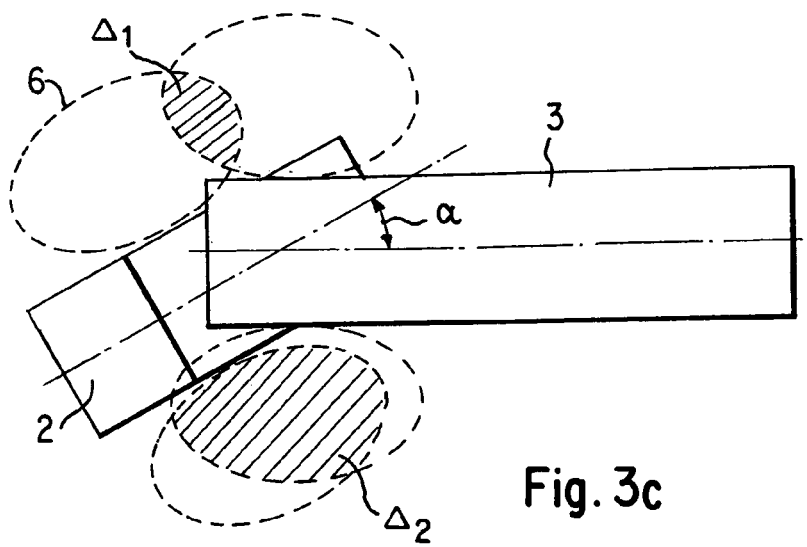
FIG. 3c shows a representation, corresponding to FIG. 3a, but with fields of view drawn in for a plurality of monitoring cameras on opposite sides of the vehicle.

As may be gathered from FIG. 3c, the articulation angle α can also be determined from the current degree of intersection of directly neighbouring fields of view 6 in the area of the articulation axis of the vehicle. Intersection areas which are a function of the articulation angle α are produced in the area of the articulation axis of the vehicle. Depending on the relative position of the tractor 2 and semitrailer 3, the intersection areas $\Delta_1$ and $\Delta_2$ are smaller and larger, respectively, in the vicinity of the articulation axis on the opposite sides of the vehicle than in the case of a vehicle which is standing straight. The articulation angle α can also be deduced from the difference in the degree of intersection of opposite intersection areas $\Delta_1$ and $\Delta_2$, respectively. However, it is also possible to deduce the articulation angle α by using only the knowledge of the degree of intersection of a single intersection area $\Delta_1$ or $\Delta_2$.

Figure 4:
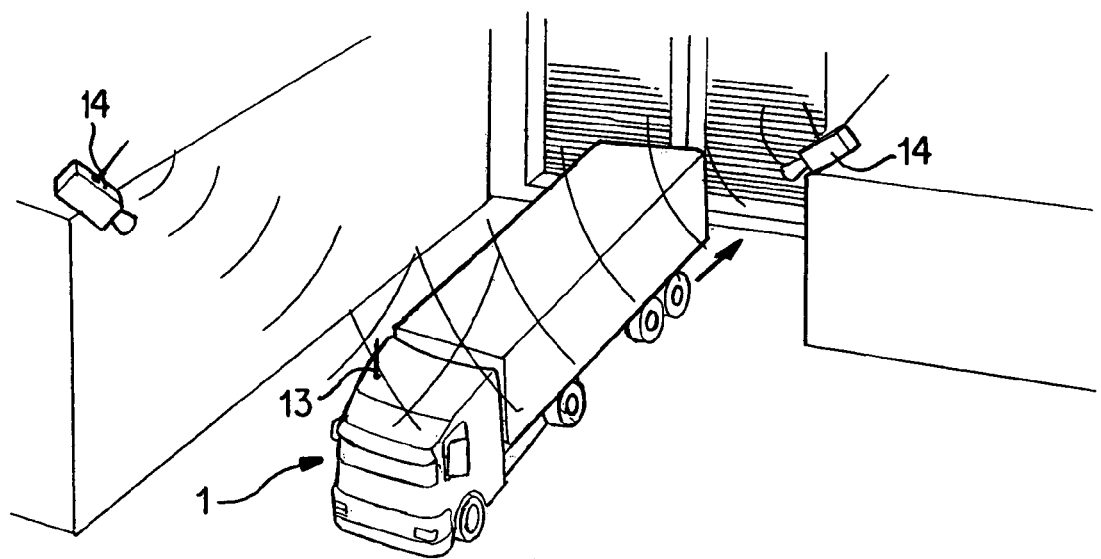
FIG. 4 shows the vehicle in a manoeuvring situation with additional external monitoring cameras.

The vehicle 1 represented in FIG. 4 is provided with a receiving device 13 which receives images from external cameras 14 which are arranged in a stationary fashion, for example in narrow entrances to courtyards. The images from the external cameras 14 are taken into account in addition to the images produced by the vehicle's own obstacle-detecting devices, and processed together with these images to form an overall image. The area to be monitored can be enlarged by taking account of the external cameras 14.

Figure 5:
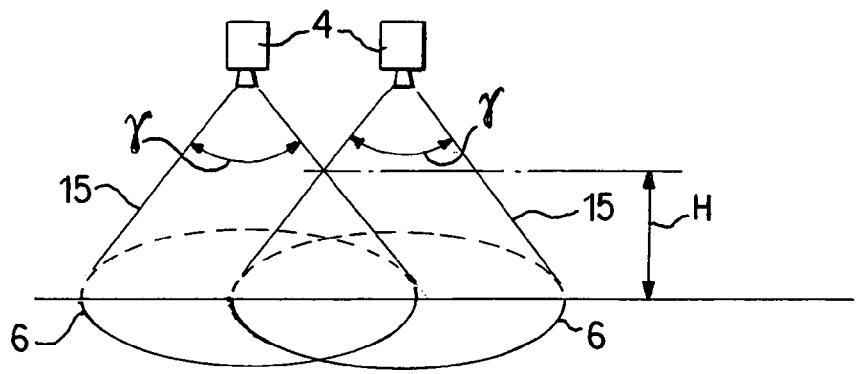
FIG. 5 shows a representation of intersecting spatial viewing cones of two neighbouring cameras.

FIG. 5 shows the recording cones 15 of two neighbouring cameras 4 on the vehicle. The recording cones 15 each produce a field of view 6 on the ground, the degree of the intersection of the two recording cones 15 being a function of the height of the cameras 4 above the ground and of the conical angle γ of the recording cones 15. The two recording cones 15 intersect at a height H above the ground; all foreign objects within the recording cones 15 are detected optically and displayed on the overall image. Foreign objects which are located outside the recording cones 15, for example in the interspace between the cameras which lies above the height H, are, by contrast, no longer detected.

Figure 6:
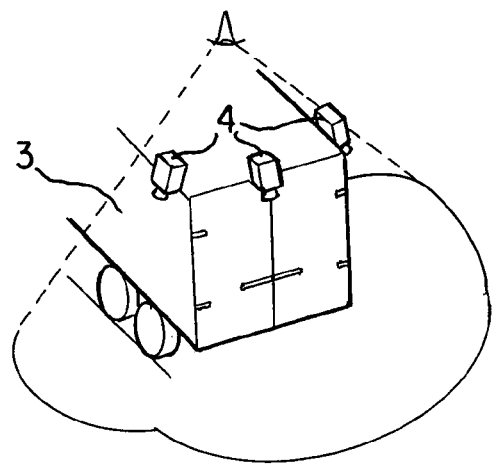
FIG. 6 shows a detail from the tail-end area of the vehicle with in each case one camera on each side and a camera at the tail end, FIGS. 7a, b show a mobile detecting device with cameras which are able to be dismantled and loaded.

As may be gathered from FIG. 6, it can be sufficient to monitor only a partial area around the vehicle. Arranged in accordance with FIG. 6 in the tail-end area of the semitrailer 3 are a total of three cameras 4, two on opposite lateral areas and, one camera on the rear of the vehicle. All the cameras 4 are arranged in the area of the upper edge of the vehicle, and the viewing axis of the camera is directed obliquely downwards.

FIGS. 7a and 7b show a mobile detecting device which is designed as a camera 4 in the exemplary embodiment. In order to keep the number of requisite monitoring cameras to a minimum, it suffices when changing semitrailers in each case to fit a monitoring system only to the semitrailer currently used in each case. The mobile camera system shown in FIGS. 7a and 7b can be used for this purpose.

In FIG. 7a, a mobile camera 4, in particular a radio camera, is fitted with a transmitting unit 16 and a rechargeable battery 17. The camera can be suspended on a holder 18 which is expediently arranged in the driver's cab and is equipped with a power supply unit for charging the battery 17 of the camera 4. After charging and if required, the mobile camera 4 can be inserted into a holder rail 19 arranged on the outside of the vehicle (FIG. 7b). The images recorded are transmitted via the transmitting unit 16 on each camera 4 to an evaluation unit contained in the vehicle and are combined there to form an overall image to be displayed. It can be expedient, if appropriate, to display only the image of a single camera. It is also possible to provide the mobile camera in addition to the stationary monitoring apparatus.

FIGS. 8a and 8b show the advantages of different arrangements and alignments of sensors 20 on the vehicle 1. In accordance with FIG. 8a, a sensor 20—infrared or ultrasonic—is arranged on the lower, rear area of the vehicle 1 in order to monitor the tail-end area of the vehicle, and is aligned with a horizontal viewing axis 5. When the vehicle 1 is reversing, it is therefore possible to determine the distance a from an obstacle 9.

In accordance with FIG. 8b, the sensor 20 is arranged in the tail-end area on the upper edge of the vehicle 1, its viewing axis 5 being directed obliquely downwards into the rear tail-end area. In this arrangement, all the obstacles and foreign objects which are located in the recording cone of the sensor 20 can be detected up to the height of the sensor 20 against the ground.

What is claimed is:

1. An obstacle-detecting system for monitoring the surroundings of an object, said system comprising:
   a plurality of obstacle-detecting devices fastened directly on the object providing a corresponding plurality of individual images;
   an evaluation unit for at least one of evaluating and producing at least one image of an obstacle from said plurality of individual images, and;
   an optical display device for displaying the at least one image, wherein fields of view of neighbouring ones of said plurality of obstacle-detecting devices intersect, wherein the individual images of said neighbouring obstacle-detecting devices are combined to form a coherent overall image, and wherein a representation of the object is superimposed on the optical display device into an overall image, and is displayed as part of the overall image.

2. The system according to claim 1, wherein the object is a vehicle.

3. The system according to claim 1, wherein the object is arranged in a stationary fashion.

4. The system according to claim 1, wherein the obstacle-detecting devices are arranged distributed over the circumference of the object for the purpose of representing a 360° perspective.

5. The system according to claim 1, wherein the viewing axes of two of said plurality of obstacle-detecting devices arranged directly next to one another run substantially parallel to one another.

6. The system according to claim 1, wherein viewing axes of all the obstacle-detecting devices are directed towards the ground.

7. The system according to claim 1, wherein the object is displayed as an artificially produced equivalent image on the optical display device.

8. The system according to claim 1, wherein at least one obstacle-detecting device is an optical camera.

9. The system according to claim 1, wherein at least one obstacle-detecting device is an infrared scanning system.

10. The system according to claim 1, wherein at least one obstacle-detecting device is a radar system.

11. The system according to claim 1, wherein at least one obstacle-detecting device is an acoustic system.

12. The system according to claim 1, wherein the optical display device is a monitor.

13. The system according to claim 1, wherein at least one obstacle-detecting device is arranged on the object in a moveable fashion.

14. The system according to claim 1, wherein at least one external obstacle-detecting device arranged outside the object whose signals are transmitted to the evaluation unit.

15. A method for monitoring the surroundings of an object, comprising:
- providing a plurality of obstacle detecting devices fastened directly on the object and outputting a corresponding plurality of individual images with mutually intersecting fields of view;
- evaluating said individual images;
- combining said individual images to form a first overall image from a zone near said object;
- superimposing a representation of the object into said first overall image; and
- optically displaying a second overall image including said representation of said object superimposed into said first overall image.

16. An apparatus for monitoring the surroundings of an object, comprising:
- at least one obstacle detecting device positioned directly on said object for producing at least one image when neighboring ones of said at least one obstacle detecting device provide intersecting fields of view;
- an evaluation unit for combining said neighboring ones of said at least one image to form a coherent first overall image wherein said evaluation unit includes a projecting device for superimposing a representation of the object unto the first overall image to provide a second overall image; and
- an optical display device for displaying said second overall image.

* * * * *